United States Patent
Smith et al.

(10) Patent No.: US 12,084,134 B2
(45) Date of Patent: Sep. 10, 2024

(54) CONTROLLED CYLINDER RETRACTION WITH A CLOSED HYDRAULIC SYSTEM

(71) Applicant: AGCO Corporation, Duluth, GA (US)

(72) Inventors: Evan Thomas Smith, Spirit Lake, IA (US); Derek D. Hruska, Lime Springs, IA (US); Alan D. Gustafson, Lakefield, MN (US)

(73) Assignee: AGCO Corporation, Duluth, GA (US)

( * ) Notice: Subject to any disclaimer, the term of this patent is extended or adjusted under 35 U.S.C. 154(b) by 649 days.

(21) Appl. No.: 17/312,520

(22) PCT Filed: Oct. 29, 2019

(86) PCT No.: PCT/IB2019/059257
§ 371 (c)(1),
(2) Date: Jun. 10, 2021

(87) PCT Pub. No.: WO2020/121080
PCT Pub. Date: Jun. 18, 2020

(65) Prior Publication Data
US 2022/0049726 A1    Feb. 17, 2022

Related U.S. Application Data

(60) Provisional application No. 62/779,007, filed on Dec. 13, 2018.

(51) Int. Cl.
*B62D 55/30*    (2006.01)
*F15B 1/04*    (2006.01)
*F15B 15/14*    (2006.01)

(52) U.S. Cl.
CPC .......... *B62D 55/305* (2013.01); *B62D 55/30* (2013.01); *F15B 1/04* (2013.01); *F15B 15/1423* (2013.01)

(58) Field of Classification Search
CPC .... B62D 55/30; B62D 55/305; F15B 15/1423
See application file for complete search history.

(56) References Cited

U.S. PATENT DOCUMENTS

| | | | |
|---|---|---|---|
| 2,998,998 A | 9/1961 | Hyler et al. | |
| 3,101,977 A * | 8/1963 | Hyler | F16H 7/14 305/145 |
| 4,227,748 A | 10/1980 | Meisel, Jr. | |
| 5,005,920 A | 4/1991 | Kinsinger | |
| 6,027,185 A | 2/2000 | Crabb | |
| 6,305,762 B1 * | 10/2001 | Oertley | B62D 55/30 305/145 |
| 6,336,690 B2 * | 1/2002 | Toms | B62D 55/30 305/144 |

(Continued)

OTHER PUBLICATIONS

UK Intellectual Property Office, Search Report for related UK Application No. GB1820858.7, dated Jun. 20, 2019.

(Continued)

*Primary Examiner* — Jason R Bellinger

(57) ABSTRACT

An apparatus having an accumulator fluidly coupled to a cylinder having a moveable rod and a pressure relief valve, the cylinder configured to produce an increase in resistance to retraction of the cylinder by re-routing fluid flow to the accumulator through the pressure relief valve after the rod has reached a defined retraction distance.

20 Claims, 7 Drawing Sheets

(56) References Cited

U.S. PATENT DOCUMENTS

| | | | |
|---|---|---|---|
| 7,172,257 B2 * | 2/2007 | Tamaru | B62D 55/30 305/145 |
| 2003/0117017 A1 * | 6/2003 | Hoff | B62D 55/30 305/143 |
| 2017/0217517 A1 * | 8/2017 | Bandil | B62D 55/06 |

OTHER PUBLICATIONS

European Patent Office, International Search Report for related International Application No. PCT/IB2019/059257, mail date Jan. 30, 2020.

\* cited by examiner

CONTROLLED CYLINDER RETRACTION WITH A CLOSED HYDRAULIC SYSTEM

CROSS-REFERENCE TO RELATED APPLICATIONS

This application is a national phase entry under 35 U.S.C. § 371 of International Patent Application PCT/IB2019/059257, filed Oct. 29, 2019, designating the United States of America and published in English as International Patent Publication WO 2020/121080 A1 on Jun. 18, 2020, which claims the benefit of the filing date of U.S. Provisional Patent Application 62/779,007, "Controlled Cylinder Retraction with a Closed Hydraulic System," filed Dec. 13, 2018; the entire disclosure of each of which is incorporated herein by reference.

TECHNICAL FIELD

The present disclosure is generally related to endless track vehicles, and more particularly, maintaining proper track tension in endless track vehicles.

BACKGROUND

Endless track laying vehicles often use contact between drive blocks on the inside of a track system and a drive wheel to transfer rotational motion of the drive wheel to the track. This is often referred to as a positive drive system. Many of these systems offer some type of oscillation to create a smoother ride. This design is based on track systems that use a hydraulic ram and an accumulator in a closed system to control the location of idler wheels in relation to the rest of the track frame, which in turn regulates the tension on the track belt. Under certain circumstances of high braking torque (e.g., emergency braking), it may be possible for the hydraulic ram to be forced to a position of retraction that permits enough track belt slack to allow the drive blocks to jump or slip over cogs of the drive wheel. This condition may cause problems in vehicle operation and/or its presence may lead to issues pertaining to roading regulations.

BRIEF SUMMARY

One object of the present disclosure is to provide an apparatus that is used to increase track tension in an endless track system. In a first embodiment, an apparatus is disclosed that comprises an accumulator fluidly coupled to a cylinder comprising a moveable rod and a pressure relief valve. The cylinder is configured to produce an increase in resistance to retraction of the cylinder by re-routing fluid flow to the accumulator through the pressure relief valve after the rod has reached a defined retraction distance. By providing a dynamic, variable resistance to retraction, track belt tension is maintained, while also avoiding excessive forces on components when higher track belt tension is not required.

In one embodiment, the cylinder comprises a first portion comprising a first port, a second port, and the pressure relief valve. The pressure relief valve is configured to regulate fluid flow from the second port to the accumulator. The cylinder also comprises a ram in slidable relation to the first portion, and the ram has an internal recess. A spring is disposed in the internal recess. The rod is moveable by the spring. The structure of the apparatus provides a relatively low profile device that prevents or mitigates slippage/jumps between the drive wheel and the endless track belt during an emergency stop.

In one embodiment, the accumulator comprises a port and the first portion comprises plural fluid passageway, the plural fluid passageways comprising a first fluid passageway that fluidly couples the first port to the port and a second fluid passageway that fluidly couples the second port to the first fluid passageway. The different fluid passageways enable the cylinder to dynamically control the pressure in the cylinder via the regulation of the flow of fluid between the cylinder and the accumulator using what is effectively a parallel arrangement of check valve and relief valve functions.

In one embodiment, the pressure relief valve of the cylinder is configured to permit fluid flow from the second port to the first fluid passageway when the rod prevents fluid flow from the first port to the accumulator. The pressure relief valve, coupled with the check valve function of the rod, enables pressure to build to a preset or predefined level corresponding to a certain stroke length or range of the ram.

In one embodiment, the pressure relief valve is configured to prevent fluid flow from the second port to the first fluid passageway when the rod permits fluid flow from the first port to the accumulator. The rod in relation to the first port provides a check valve function that is present during a certain stroke length and absent during the balance of the stroke length of the cylinder to improve the dynamic capabilities of a track tensioning system.

These and other aspects will be apparent from and elucidated with reference to the embodiments described hereinafter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
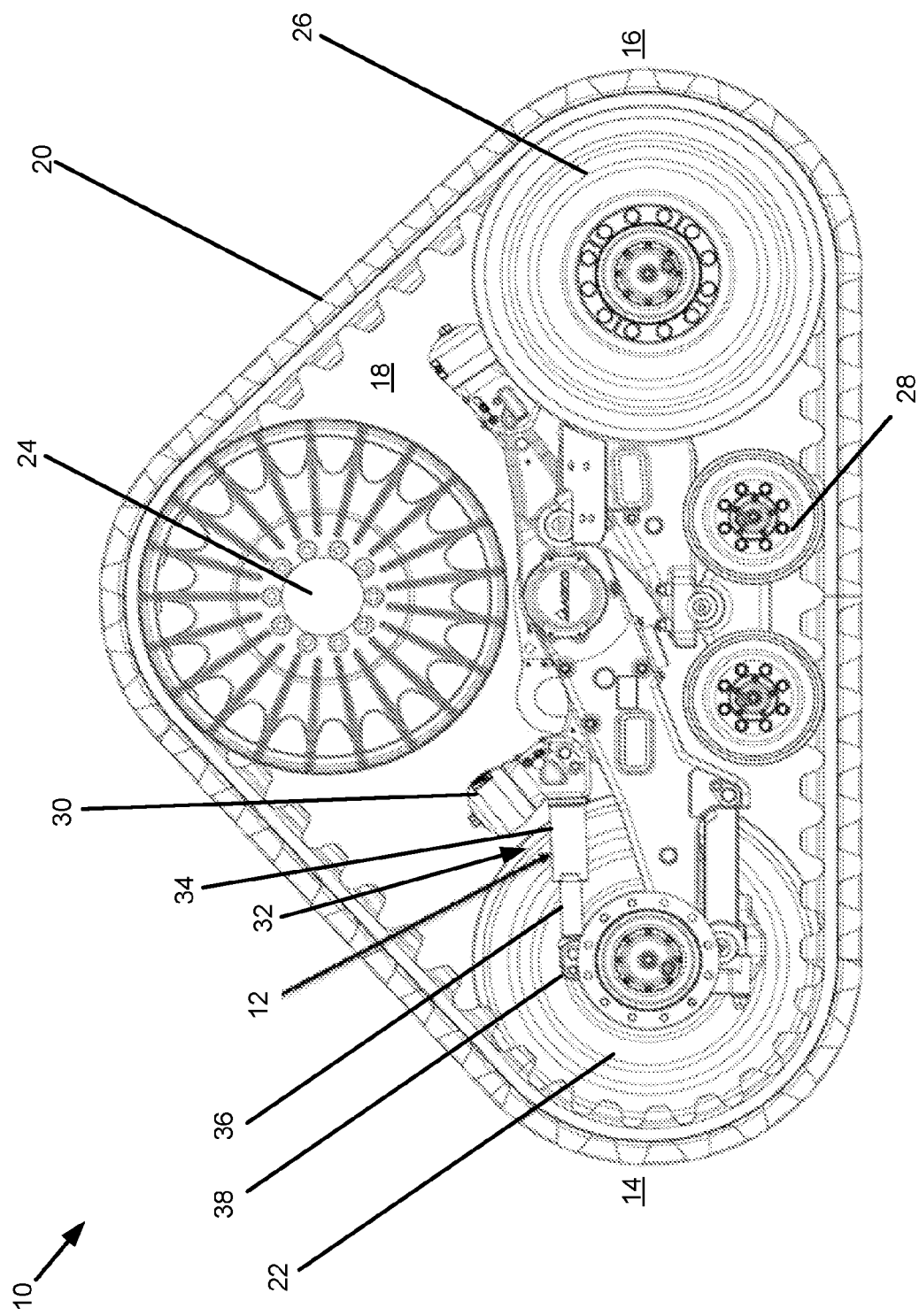
FIG. 1 is a schematic diagram that illustrates, in side-elevation, fragmentary view, an example endless track system in which an embodiment of a controlled-retraction apparatus is used.

Certain embodiments of a controlled-retraction apparatus and associated systems and methods (hereinafter, referred to collectively as a controlled-retraction apparatus) are disclosed that may be implemented in any vehicle that uses an endless track system (e.g., continuous track system) to increase endless track belt tension in instances of high braking torque to prevent or mitigate a condition of too much slack in endless track belt tension. The controlled-retraction apparatus may be a component of a track tensioning system that cooperates with an endless track frame that comprises at least an idler wheel, a drive wheel, and an endless track belt, wherein the track tensioning system extends and retracts the idler wheel to control or maintain tension at an interface between the drive wheel and the endless track belt. In one embodiment, the controlled-retraction apparatus comprises an accumulator fluidly coupled to a cylinder. The cylinder (e.g., hydraulic cylinder) comprises a ram that is coupled to the idler wheel via a linkage. The cylinder comprises plural fluid passageways in the cylinder head, with the cylinder further comprising a biasing mechanism (e.g., compression spring) that enables movement of a center rod or plunger relative to a port of one of the fluid passageways, the movement resulting in a varying gap between the center rod and the port (to permit fluid flow past the port, through the fluid passageway, and to the accumulator) or resulting in a closing of the port (to prevent fluid to pass through the port, and momentarily preventing fluid ingress to the accumulator from that port to enable a momentary buildup of pressure or resistance to the retraction). For instance, during a hard braking (e.g., high torque) event (e.g., emergency stop), the ram extends a linkage, which in turn extends the idler wheel further against the endless track to increase tension on the track. During retraction of the ram (e.g., due to momentum), the controlled-retraction apparatus produces a buildup of cylinder pressure during a certain range of the ram stroke by closing off one of the ports to the accompanying fluid passageway to the accumulator, which in turn resists the retraction momentarily to maintain a suitable endless track belt tension. The cylinder head comprises another port that provides another passageway to the accumulator. Fluid flow re-routed through this other passageway is regulated by a pressure relief valve. Upon the pressure buildup reaching a predefined or preset limit of the pressure relief valve (corresponding to a defined retraction distance for the rod, which varies depending on cylinder and plunger lengths, but is suitable to ensure that tension is maintained on the end track belt during retraction to prevent slippage or jumps at the interface of the belt and drive wheel), the pressure relief valve activates (e.g., opens immediately) to permit fluid flow to the accumulator while the other port is closed by the rod. The buildup of pressure is based on the combination of the closing off of the port by the center rod and the pressure relief valve setting, which changes the force dynamics of the ram during retraction.

Digressing briefly, and as noted in part in the background, in conventional endless track systems, during retraction from a hard braking action, tension in the endless track belt may be inadequate to prevent a significant gap between the drive wheel and the endless track belt, which may lead to an insufficient interface between the drive wheel and endless track belt and jumping or slipping of drive blocks over cogs of the drive wheel. To counter this condition, certain embodiments of a controlled-retraction apparatus resist retraction by dynamically changing cylinder pressure, and in particular, by producing an increased cylinder pressure up to the pressure relief valve setting, which restrains at least temporarily the stroke action of the ram.

Having summarized certain features of a controlled-retraction apparatus of the present disclosure, reference will now be made in detail to the description of the disclosure as illustrated in the drawings. While the disclosure will be described in connection with these drawings, there is no intent to limit it to the embodiment or embodiments disclosed herein. For instance, though the controlled-retraction apparatus described below operates without any external controls (e.g., no electronically/electro-magnetically controlled apparatus), in some embodiments, an electronically/electro-magnetically controlled, controlled-retraction apparatus may be used. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications, and equivalents included within the scope of the disclosure as defined by the appended claims. Further, it should be appreciated in the context of the present disclosure that the claims are not necessarily limited to the particular embodiments set out in the description.

Note that reference herein to an endless track belt is intended to contemplate elastomeric-based track belts (e.g., rubber belts, fabric reinforced rubber belts, etc.), metal-based track belts (e.g., chain of metal plates, links, etc.), or track belts comprising a combination of metal and elastomeric-based material.

FIG. 1 illustrates in cut-away view an example endless track system 10 in which an embodiment of a controlled-retraction apparatus 12 is used. The endless track system 10 may be a motive mechanism for any of a variety of vehicles, including those for the agricultural industry (e.g., a tractor), construction industry (e.g., bulldozers, excavators), military (e.g., tanks, personnel carriers), science/research (e.g., exploratory rovers), among other industries. The endless track system 10 depicted in FIG. 1 comprises a front 14 and back 16, and comprises an endless track frame 18 that comprises an endless track belt 20, a front pair of idler wheels 22 (one shown), a drive wheel 24, and a pair of rear bogie wheels/rollers 26. One or more pairs of bogie wheels/rollers 28 may also be used. It should be appreciated by one having ordinary skill in the art that the endless track frame 18 depicted in FIG. 1 is merely illustrative of one example track system, and that in some embodiments, a different endless track frame comprising a different arrangement of idler, drive, and/or bogie wheels/rollers may be used and hence are contemplated to be within the scope of the disclosure. In one embodiment, the idler wheels 22 straddle guide blocks disposed along the longitudinal center of the interior of the endless track belt 20. The idler wheels 22 are used to adjust the tension of the endless track belt 20 as described below. As is known, the drive wheels 24 are powered by the engine of the vehicle via a hydraulic circuit comprising motor(s) and pump(s). The drive wheel 24 engages the endless track belt 20 to provide motion for the vehicle, and in particular, drives the endless track 20 around the idler wheels 22 and bogie wheels/rollers 26 and 28, thereby advancing the vehicle along a surface. The drive wheel 24 may interface with the interior of the endless track 20 via friction or via a drive sprocket/cogs that mechanically engages (drive) blocks on the interior side of the endless track 20. The endless track belt 20 may be comprised of metal, rubber, or any combination thereof, as explained above. Because the idler wheels 22, drive wheel 24, and bogie wheels/rollers 26, 28 are known, further discussion of these elements is omitted for brevity except as used below to describe certain embodiments of a controlled-retraction apparatus 12. The controlled-retraction apparatus 12 comprises an accumulator 30 fluidly coupled via plural fluid passageways to a cylinder (e.g., hydraulic cylinder) 32. The cylinder comprises a first portion 34 in slidable relation to a ram 36, as explained further below in association with FIG. 2.

The endless track frame 18 comprises a track tensioning system that includes the idler wheel(s) 22, a linkage 38 (e.g., lever, partially shown), and the controlled-retraction apparatus 12. The track tensioning system controls the tension of the endless track belt 20 through extension and retraction of the idler wheel(s) 22 against the endless track belt 20. For instance, the ram 36 is coupled to the linkage 38, which when the ram 36 is extended, causes the idler wheel(s) 22 to move forward, increasing tension on the endless track belt 20. Retraction of the ram 36 (e.g., via retraction of the linkage 38 and idler wheel(s) 22) causes a reduction in the tension of the endless track belt 20. For instance, during a hard braking (e.g., an emergency stop), the idler wheel 22 is moved forward against the endless track belt 20, and during retraction, there is a rapid deceleration of the idler wheel 22 that reduces the tension of the endless track belt 20. Certain embodiments of a controlled-retraction apparatus 12 create a dynamic resistance to the retraction to prevent or mitigate the risk of slippage/jumps between the endless track belt 20 and the drive wheel(s) 22 that may result from the loosened tension of the endless track belt 20, as further explained below.

Figure 2:
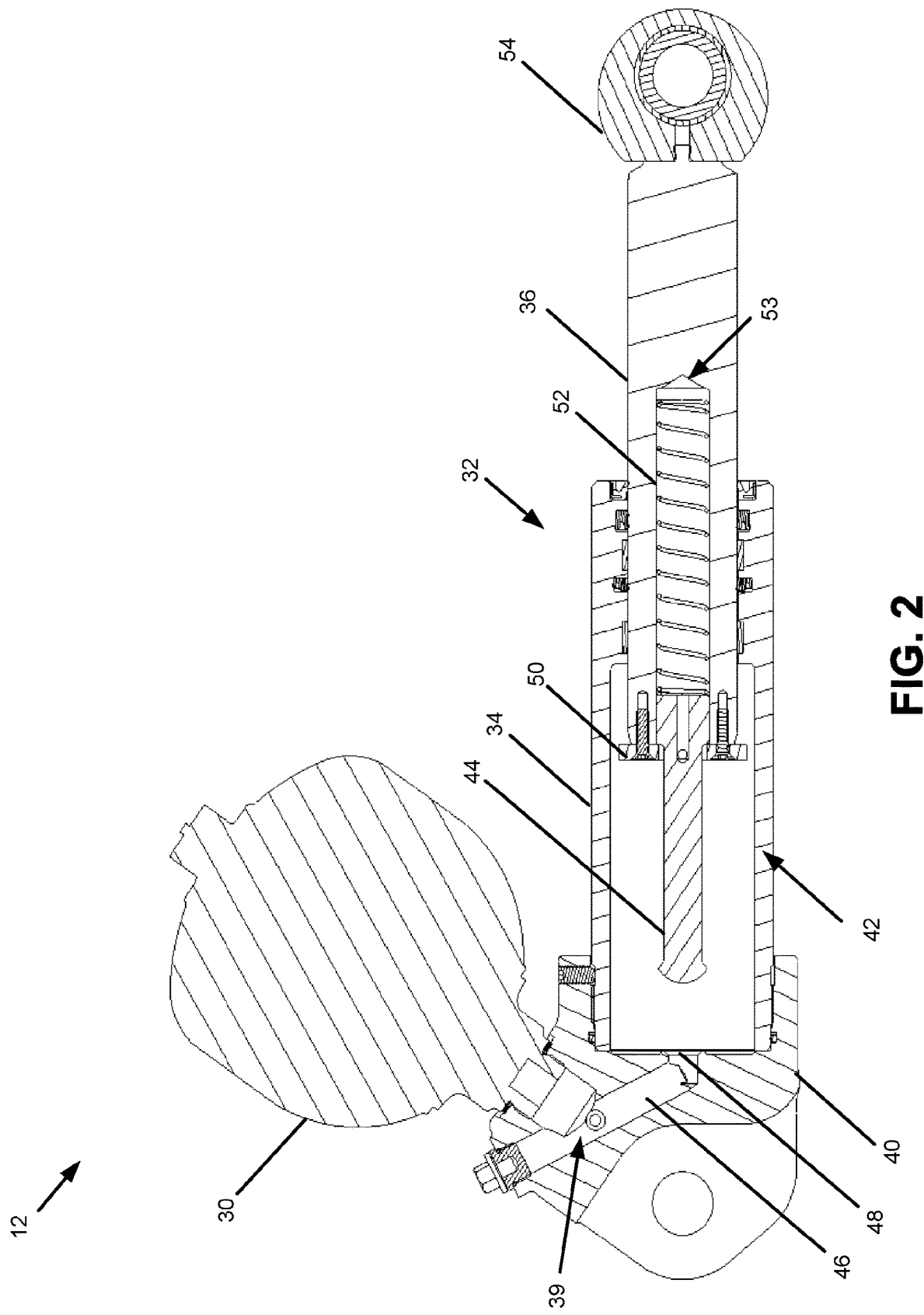
FIG. 2 is a schematic diagram that illustrates, in side-elevation, cut-away view, an embodiment of an example controlled-retraction apparatus.

FIG. 2 shows a cut-away view of the controlled-retraction apparatus 12, further illustrating components described above in association with FIG. 1 and additional components/features. In one embodiment, the controlled-retraction apparatus 12 comprises the (hydraulic) accumulator 30 in fluid communication with the cylinder 32. The hydraulic accumulator 30 comprises nitrogen in the top volume of the accumulator 30, though other (e.g., inert) gases may be used in some embodiments. The accumulator 30 may be embodied as a diaphragm or bladder-style accumulator, or in some embodiments, as a piston-style accumulator. The accumulator 30 comprises an inlet port 39 that is fluidly coupled to a fluid passageway of the cylinder 32. The cylinder 32 comprises the first portion 34 and the ram 36 that slidably cooperates with the first portion 34. In one embodiment, the ram 36 comprises a single-acting ram. The first portion 34 comprises a cylinder head 40. The cylinder head 40 comprises plural ports (e.g., two) and plural passageways (e.g., two) that fluidly couple the cylinder 32 to the accumulator 30, the ports and fluid passageways also described below in conjunction with FIGS. 3A-3C. The first portion 34 further comprises a rod guide 42. The cylinder 32 further comprises a center rod 44 (also referred to merely as a rod) that interfaces with the cylinder head 40 in such a manner that fluid flow (e.g., hydraulic oil flow) from the rod guide 42 to a fluid passageway 46 of the cylinder head 40 is blocked when the center rod 44 comes into contact with a port 48 of the cylinder head 40, the port 48 comprising an entrance to the fluid passageway 46. In other words, fluid flow is blocked when the center rod 44 is in contact with and blocks the port 48, which occurs according to a certain stroke range of the ram 36 (and hence retraction distance of the center rod 44) to increase resistance to retraction in hard braking events. The center rod 44 is held inside the ram 36 by a retainer plate 50. The center rod 44 is forced outward from the ram 36 (e.g., in a direction towards the port 48) by a compression spring 52 that is disposed in a recess 53 of the ram 36. The ram 36 is coupled on one end to a rod eye 54, which couples to the linkage 38 (FIG. 1) to translate extension and retraction to the idler wheel(s) 22.

Figure 3A:
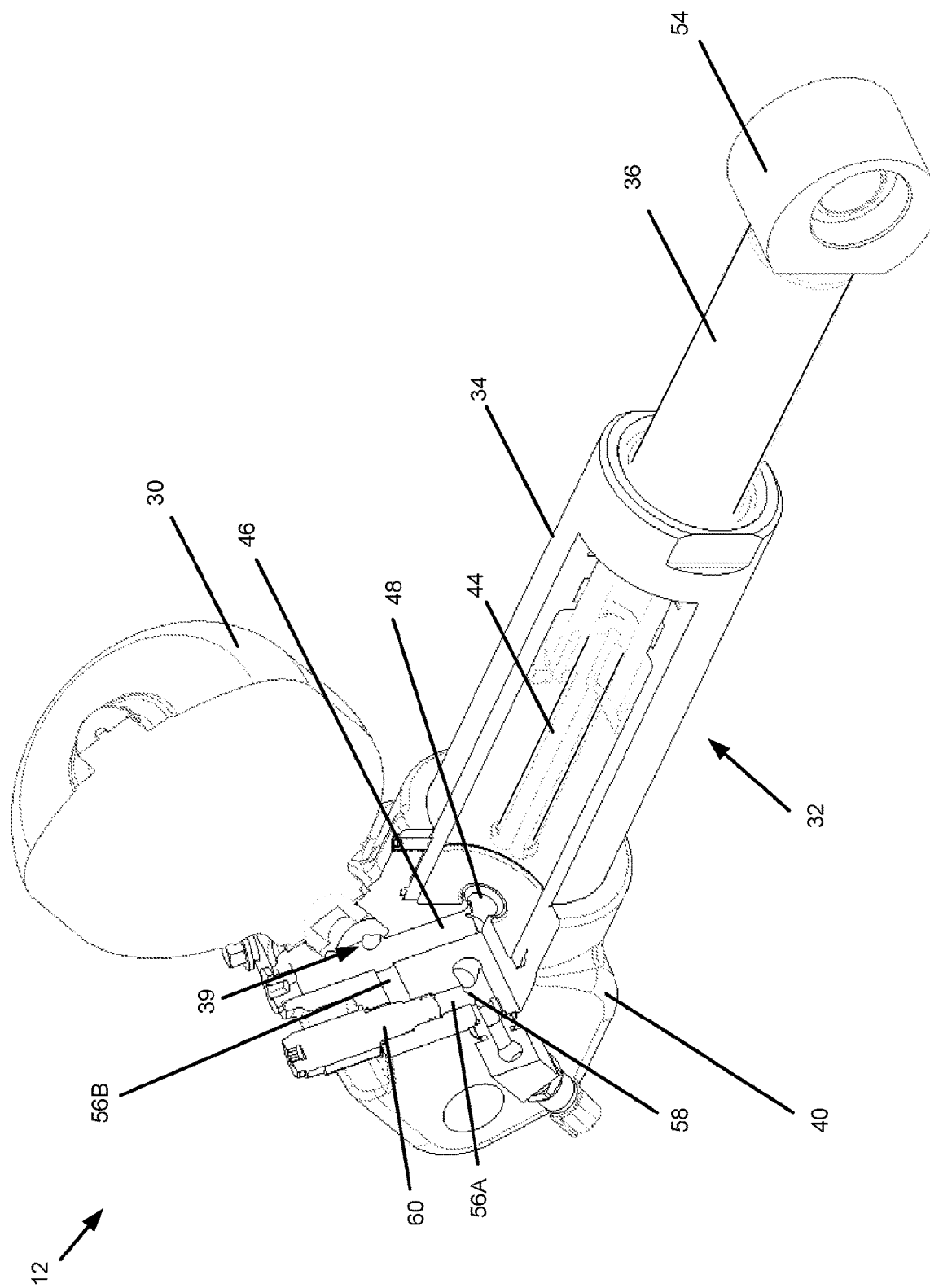
FIG. 3A is a schematic diagram that illustrates, in perspective, partial-cut-away view, an embodiment of an example controlled-retraction apparatus.
Figure 3B:
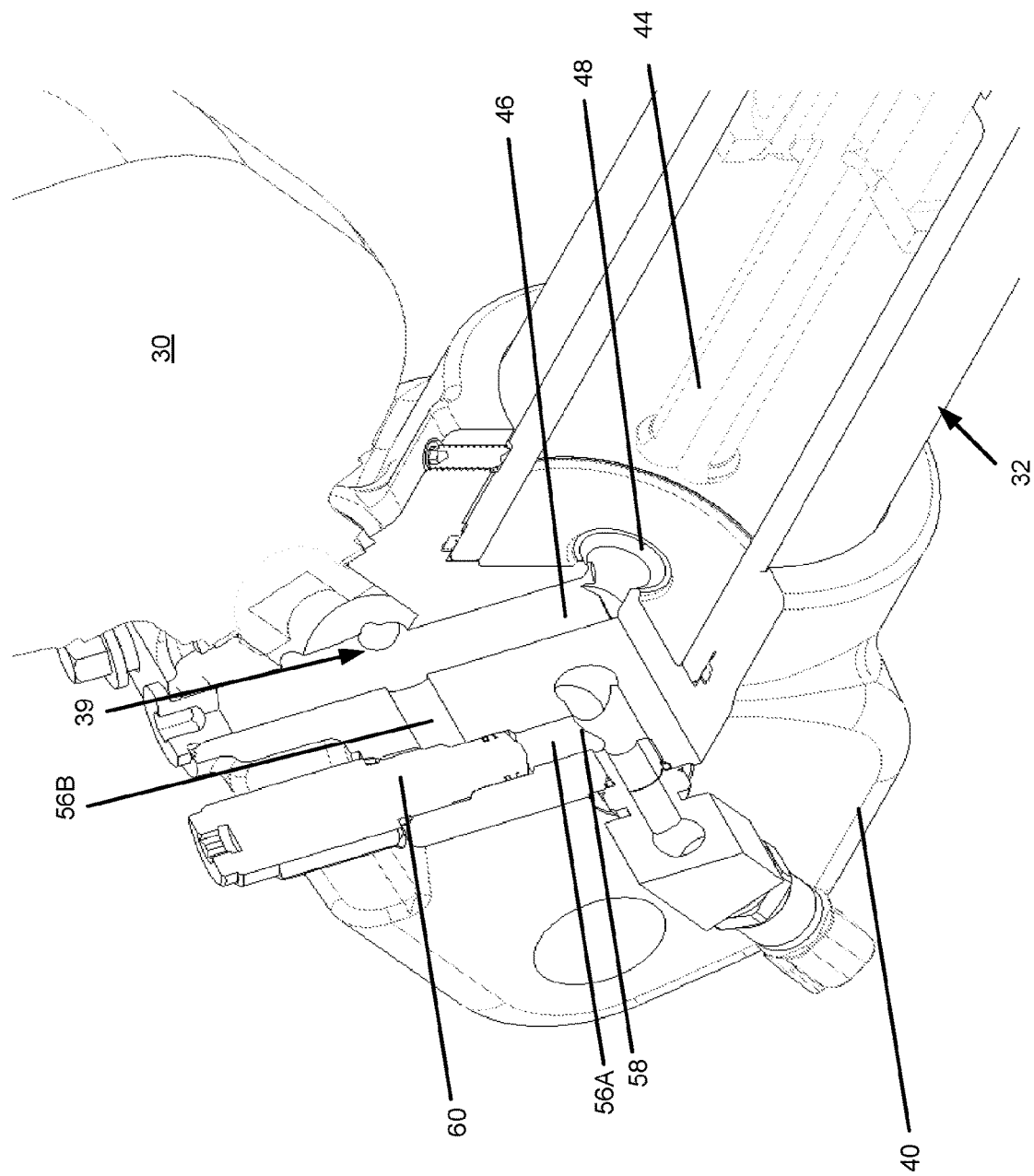
FIGS. 3B-3C are schematic diagrams that illustrate, in close-up, cut-away views, flow passageways during an example operation of an embodiment of an example controlled-retraction apparatus.
Figure 3C:
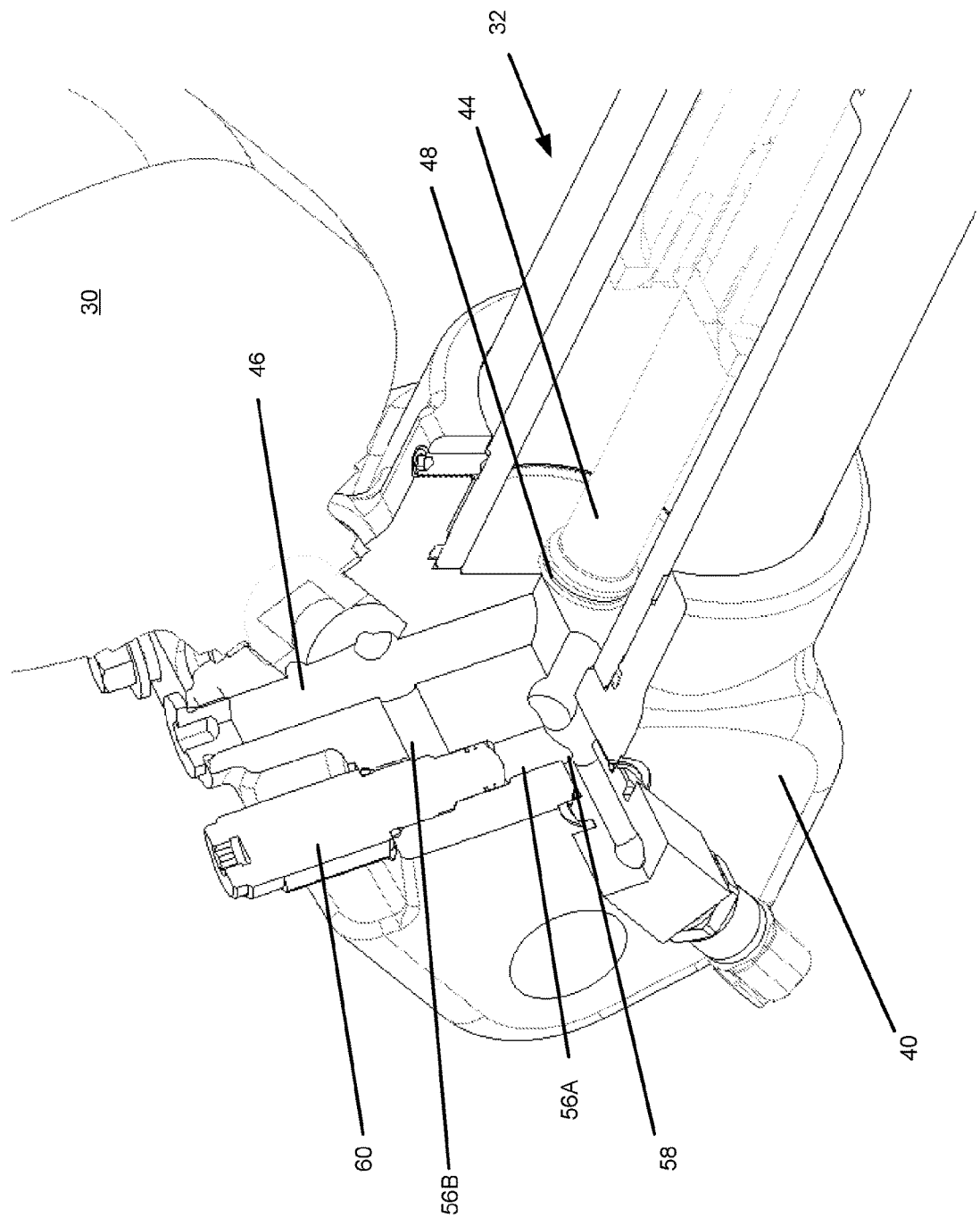

FIGS. 3A-3C further illustrate certain features of an embodiment of a controlled-retraction apparatus 12. As similarly described above, the controlled-retraction apparatus 12 comprises the accumulator 30 and the cylinder 32 comprising the first portion 34 and the ram 36. The ram 36 is coupled to the rod eye 54 to enable cooperation with the linkage 38 and idler wheel(s) 22 (FIG. 1). The first portion 34 comprises the cylinder head 40, which includes plural fluid passageways, including the fluid passageway 46 having the port 48. The cylinder 32 further comprises the center rod 44, which is moveable towards and away from the port 48, regulating fluid flow through the port 48 and the accompanying fluid passageway 46. Additionally shown in FIGS. 3A-3C is another fluid passageway 56 (e.g., 56A, 56B), wherein the entrance to the fluid passageway 56A comprises a port 58. In one embodiment, the fluid passageway 56 is fluidly coupled (after activation of the pressure relief valve as explained below) to the fluid passageway 46. The passage of fluid through the fluid passageway 56 is regulated by a pressure relief valve 60. The pressure relief valve 60 may be embodied as a cartridge-style, direct-acting pressure relief valve. The pressure relief valve 60 may be field adjustable or preset at a fixed pressure setting (e.g., set at the factory with the intent of no adjustment in the field).

Figure 4:
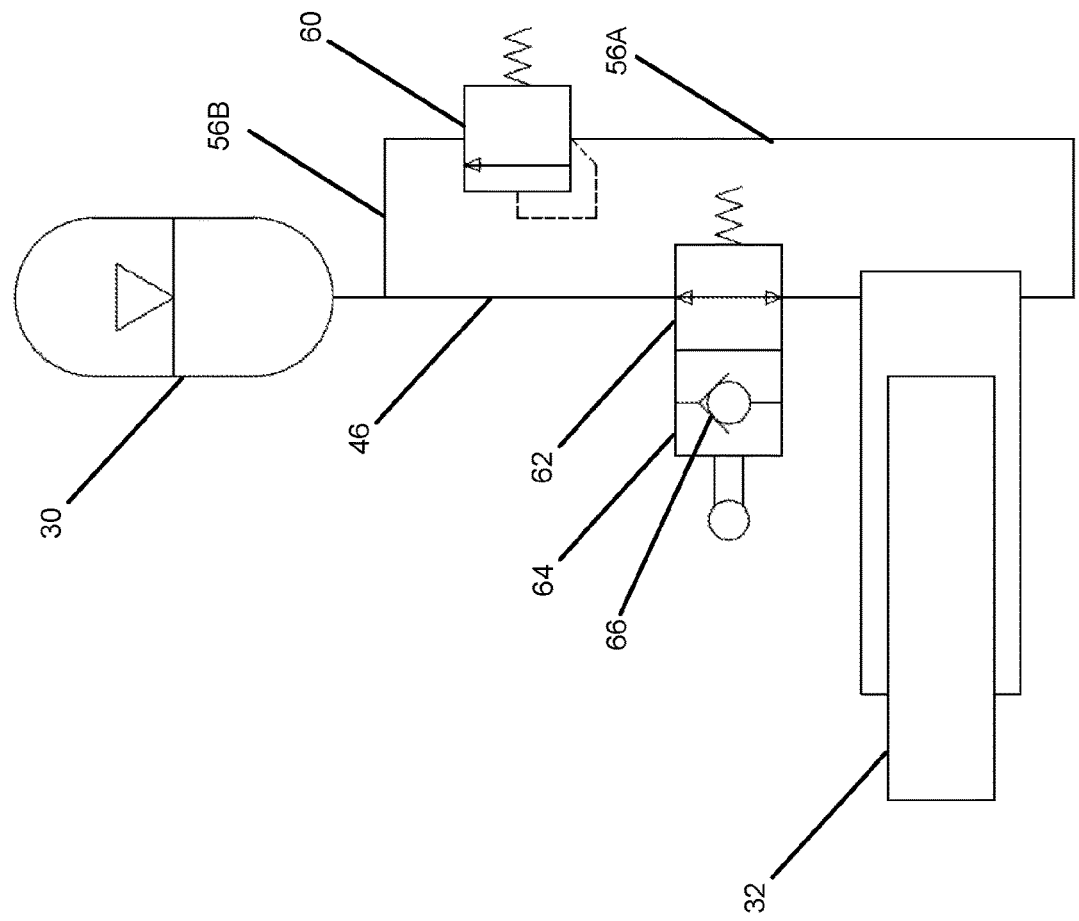
FIG. 4 is a schematic diagram that conceptually illustrates the example controlled retraction operation depicted in FIGS. 3B-3C.

To discuss an example operation of an embodiment of a controlled-retraction apparatus 12, attention is directed to both FIGS. 3B-3C and FIG. 4, where FIG. 4 conceptually illustrates various functionality of an embodiment of a controlled-retraction apparatus 12. For instance, FIG. 4 illustrates functionality for the accumulator 30 and cylinder 32, including center rod-port open functionality 62 and check valve functionality 64, as further explained below. The center rod-port open functionality 62 corresponds to the configuration shown in FIG. 3B. That is, in normal operation (e.g., not an emergency braking event), the center rod 44 is not in contact with the port 48 (as represented by the center rod-port open functionality 62), and thus fluid flows (in an amount depending on the required tension) from the cylinder 32 to the inlet port 39 of the accumulator 30 via fluid passageway 46. At the same time, the pressure relief valve 60 prevents fluid flow through the fluid passageway 56 to the accumulator 30.

Referring to the check valve functionality 64 (which corresponds to FIG. 3C, also referenced below), when the pressure inside the accumulator 30 is greater than the force of the compression spring 52, the center rod 44 is allowed to retract inside the ram 36. In this manner, the center rod 44 is acting like a typical check valve 66 commonly used in hydraulic systems. When the ram 36 is retracted, and the center rod 44 is in contact with the cylinder head 40 (e.g., closing off the port 48), the (primary) fluid passageway 46 is blocked (e.g., provided a pressure differential has not lifted the center rod 44 off of the port 48 of the cylinder head 40), the fluid flow re-routed to the fluid passageway 56. That is, a second fluid flow path is enabled via the fluid passageway 56 (e.g., 56A and 56B), based on the regulation of fluid flow through the fluid passageway 56 by the normally-closed pressure relief valve 60. When the pressure within the rod guide 42 is high enough to overcome the pressure relief setting (of the pressure relief valve 60), the pressure relief valve 60 activates (opens), and fluid (e.g., oil) flows from the rod guide 42 to the accumulator 30 via the fluid passageway 56, effectively bypassing the fluid passageway 46 closed off by the center rod 44. That is, the prevention of fluid flow through the fluid passageway 46 (by the center rod 44 closing off flow through the port 48) corresponds to the increased resistance to retraction of the ram 36 (and hence idler wheel(s) 22) responsive to an emergency braking operation. This increased resistance occurs during a specific stroke range of the ram 36, which corresponds to a defined retraction distance of the center rod 44.

Explaining further, the pressure at the inlet port 39 to the accumulator 30 and the cylinder 32 remains the same until the center rod 44 closes off the port 48. Upon the port 48 becoming closed, fluid flow is re-routed to the port 58 corresponding to the passageway 56 in which the pressure relief valve 60 regulates flow, resulting in a rapid increase in pressure in the cylinder 32. Also, at the time the fluid flow is re-routed, the pressure relief valve 60 activates (e.g., immediately upon closing of the port 48), permitting fluid flow through the passageway 56 and to the inlet port 39 of the accumulator 30. The amount of resistance to the retraction is dictated by the pressure relief valve setting, enabling a controlled retraction of the ram 36 to reduce the risk of, or even prevent, slippage/jumping at the interface between the endless track belt 20 and the drive wheel 24.

Figure 5:
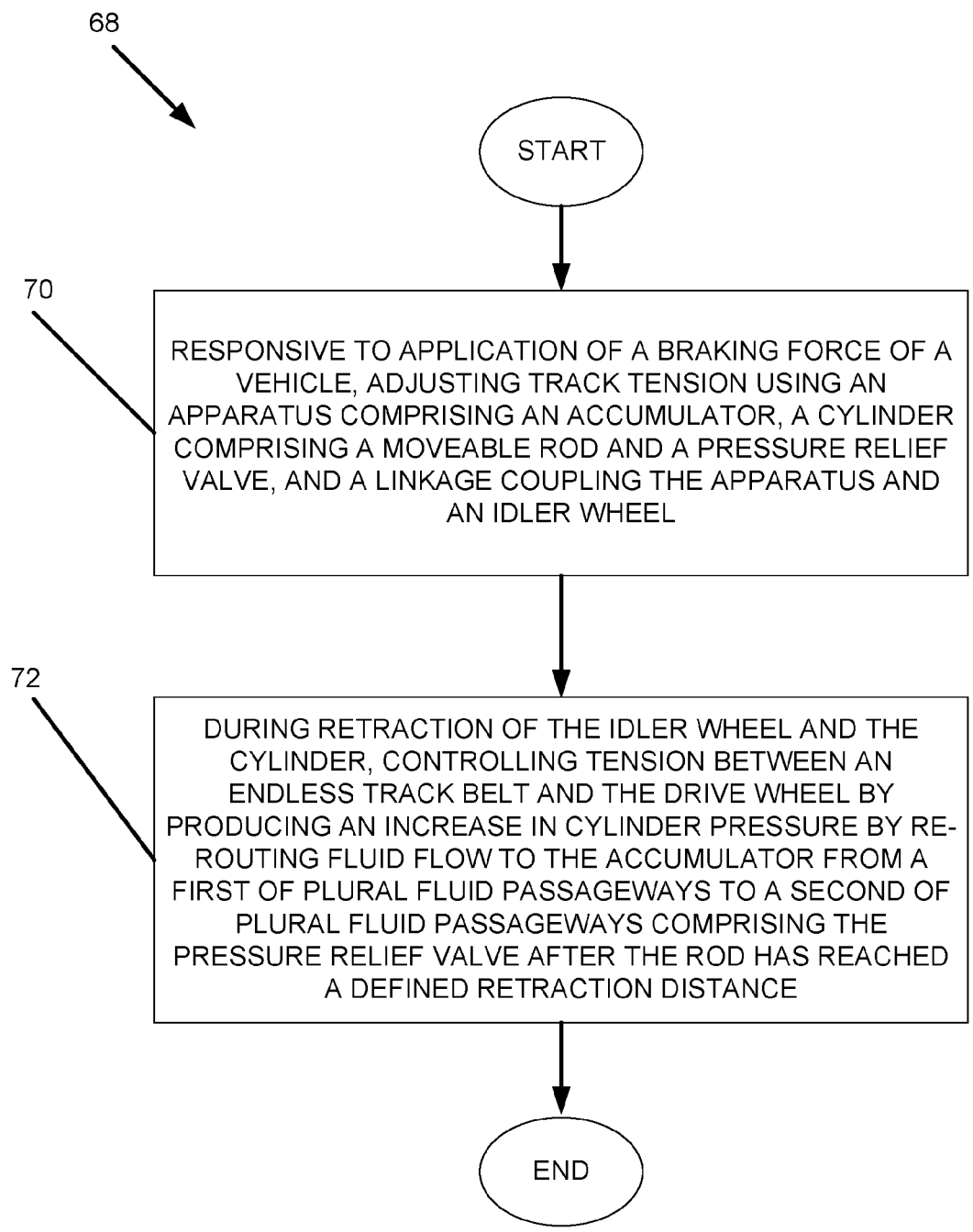
FIG. 5 is a flow diagram that illustrates an embodiment of an example controlled-retraction method.

Having described an embodiment of a controlled-retraction apparatus 12, it should be appreciated by one having ordinary skill in the art, in the context of the present disclosure, that a track tensioning method 68 for controlling/adjusting track tension for an endless track system for a vehicle, the endless track system comprising a drive wheel, an idler wheel, and an endless track belt, and described in FIG. 5, comprises: responsive to application of a braking force of the vehicle, adjusting the track tension using an apparatus comprising an accumulator, a cylinder comprising a moveable rod and a pressure relief valve, and a linkage coupling the apparatus and the idler wheel (70); and during retraction of the idler wheel and the cylinder, controlling tension between the endless track and the drive wheel by producing an increase in cylinder pressure by re-routing fluid flow to the accumulator from through a first of plural fluid passageways to a second of the plural fluid passageways comprising the pressure relief valve after the rod has reached a defined retraction distance (72).

In one embodiment, an apparatus is disclosed, comprising: an accumulator; and a cylinder fluidly coupled to the accumulator, the cylinder comprising: a first portion comprising a first port, a second port, and a pressure relief valve, the pressure relief valve configured to regulate fluid flow from the second port to the accumulator; a ram in slidable relation to the first portion, the ram comprising an internal recess and a predefined stroke length; a spring disposed in the internal recess; and a rod moveable by the spring relative to the first port while permitting fluid flow, wherein the cylinder is configured to increase resistance to retraction of the ram by re-routing fluid flow to the accumulator through the pressure relief valve after the rod has reached a defined retraction distance.

In one embodiment, the first portion comprises a cylinder head and a rod guide. The cylinder head comprises the first port, the second port, and the pressure relief valve.

In one embodiment, the rod is disposed between the spring and the cylinder head.

In one embodiment, the accumulator comprises a port and the first portion comprises plural fluid passageways. The plural fluid passageways comprise a first fluid passageway that fluidly couples the first port to the accumulator and a second fluid passageway that fluidly couples the second port to the first fluid passageway.

In one embodiment, the pressure relief valve is configured to regulate flow from the second port to the first fluid passageway via the second fluid passageway.

In one embodiment, the pressure relief valve is configured upon activation to permit fluid flow from the second port to the first fluid passageway when the rod prevents fluid flow from the first port to the accumulator.

In one embodiment, the pressure relief valve is configured to prevent fluid flow from the second port to the first fluid passageway when the rod permits fluid flow from the first port to the accumulator.

In one embodiment, the endless track system comprises an endless track frame comprising a drive wheel, an idler wheel, and an endless track belt; and a track tensioning system configured to control tension of the endless track belt. The track tensioning system is configured to control tension between the endless track belt and the drive wheel by producing an increase in cylinder pressure by the re-routing of the fluid flow.

In one embodiment, a track tensioning method uses the apparatus of any one of the prior embodiments.

In one embodiment, an endless track system is disclosed, comprising: an endless track frame comprising a drive wheel, an idler wheel, and an endless track belt; and a track tensioning system configured to control tension of the endless track belt. The track tensioning system comprises an apparatus coupled to the idler wheel via a linkage, the apparatus comprising an accumulator and a cylinder comprising a moveable rod and a pressure relief valve. The cylinder is fluidly coupled to the accumulator and configured to regulate fluid flow through a first of plural fluid passageways fluidly coupling the cylinder and the accumulator. The apparatus is configured to control tension between the endless track belt and the drive wheel by producing an increase in cylinder pressure by re-routing fluid flow to the accumulator through a second of the plural fluid passageways comprising the pressure relief valve after the rod has reached a defined retraction distance.

In one embodiment, the cylinder comprises: a first portion comprising a first port, a second port, and the pressure relief valve. The pressure relief valve is configured to regulate fluid flow from the second port to the accumulator. A ram is in slidable relation to the first portion according to a predefined stroke length, the ram comprising an internal recess. A spring is disposed in the internal recess. A rod is moveable by the spring and configured to regulate fluid flow to the accumulator from the first port to the accumulator. The movement of the rod relative to the first port causes the re-routing of the fluid flow through the pressure relief valve.

In one embodiment, the first portion comprises a cylinder head and a rod guide, and the cylinder head comprises the first port, the second port, and the pressure relief valve.

In one embodiment, the rod is disposed between the spring and the cylinder head.

In one embodiment, the accumulator comprises a port and the first portion comprises the plural fluid passageways, a first of which fluidly couples the first port to the port and a second of which fluidly couples the second port to the first of the plural fluid passageways.

In one embodiment, the pressure relief valve is configured to regulate flow from the second port to the first of the plural fluid passageways via the second of the plural fluid passageways.

In one embodiment, the pressure relief valve is configured to permit fluid flow from the second port to the first of the plural fluid passageways when the rod prevents fluid flow from the first port to the accumulator.

In one embodiment, the pressure relief valve is configured to prevent fluid flow from the second port to the first of the plural fluid passageways when the rod permits fluid flow from the first port to the accumulator.

In one embodiment, a track tensioning method for controlling track tension for an endless track system for a vehicle is disclosed. The endless track system comprises a drive wheel, an idler wheel, and an endless track belt. The method comprises, adjusting the track tension responsive to application of a braking force of the vehicle using an apparatus comprising an accumulator, a cylinder comprising a moveable rod and a pressure relief valve, and a linkage coupling the apparatus and the idler wheel. During retraction of the idler wheel and the cylinder, tension between the endless track belt and the drive wheel is controlled by producing an increase in cylinder pressure by re-routing fluid flow to the accumulator from a first of plural fluid passageways to a second of the plural fluid passageways comprising the pressure relief valve after the rod has reached a defined retraction distance.

In one embodiment, the method further comprises regulating flow from one port of the cylinder to the first of the plural fluid passageways.

In one embodiment, the method further comprises permitting fluid flow from one port of the cylinder to the first of the plural fluid passageways when fluid flow through another port of the cylinder is prevented by the rod.

In one embodiment, the method further comprises preventing fluid flow from one port of the cylinder to the first of the plural fluid passageways when the fluid flow through another port of the cylinder is not prevented by the rod.

In one embodiment, the adjustment includes moving a ram of the cylinder through a predefined stroke length.

It should be emphasized that the above-described embodiments of the present disclosure, particularly, any "preferred" embodiments, are merely possible examples of implementations, merely set forth for a clear understanding of the principles of the disclosed embodiments. Many variations and modifications may be made to the above-described embodiment(s) of the disclosure without departing substantially from the scope of the disclosure. Two or more of the embodiments disclosed herein may be combined in any combination. All such modifications and variations are intended to be included herein within the scope of this disclosure and protected by the following claims. Any reference signs in the claims should be not construed as limiting the scope.

At least the following is claimed:

1. An apparatus, comprising:
   an accumulator; and
   a cylinder fluidly coupled to the accumulator, the cylinder comprising:
   a first portion comprising a first port, a second port, and a pressure relief valve, the pressure relief valve configured to regulate fluid flow from the second port to the accumulator;
   a ram in slidable relation to the first portion, the ram comprising an internal recess and a predefined stroke length;
   a spring disposed in the internal recess; and
   a rod moveable by the spring relative to the first port while permitting fluid flow, wherein the cylinder is configured to increase resistance to retraction of the ram by re-routing fluid flow to the accumulator through the pressure relief valve after the rod has reached a defined retraction distance.

2. The apparatus of claim 1, wherein the first portion comprises a cylinder head and a rod guide, the cylinder head comprising the first port, the second port, and the pressure relief valve.

3. The apparatus of claim 2, wherein the rod is disposed between the spring and the cylinder head.

4. The apparatus of claim 1, wherein the accumulator comprises a port and the first portion comprises plural fluid passageways, the plural fluid passageways comprising a first fluid passageway that fluidly couples the first port to the accumulator and a second fluid passageway that fluidly couples the second port to the first fluid passageway.

5. The apparatus of claim 4, wherein the pressure relief valve is configured to regulate flow from the second port to the first fluid passageway through the second fluid passageway.

6. The apparatus of claim 4, wherein the pressure relief valve is configured upon activation to permit fluid flow from the second port to the first fluid passageway when the rod prevents fluid flow from the first port to the accumulator.

7. The apparatus of claim 4, wherein the pressure relief valve is configured to prevent fluid flow from the second port to the first fluid passageway when the rod permits fluid flow from the first port to the accumulator.

8. An endless track system comprising:
   an endless track frame comprising a drive wheel, an idler wheel, and an endless track belt; and
   a track tensioning system configured to control tension of the endless track belt, the track tensioning system comprising an apparatus coupled to the idler wheel by a linkage, the apparatus comprising an accumulator and a cylinder comprising a moveable rod and a pressure relief valve, the cylinder fluidly coupled to the accumulator and configured to regulate fluid flow through a first of plural fluid passageways fluidly coupling the cylinder and the accumulator, wherein the apparatus is configured to control tension between the endless track belt and the drive wheel by producing an increase in cylinder pressure by re-routing of the fluid flow to the accumulator through a second of the plural fluid passageways comprising the pressure relief valve after the rod has reached a defined retraction distance.

9. The system of claim 8, wherein the cylinder comprises:
   a first portion comprising a first port, a second port, and the pressure relief valve, the pressure relief valve configured to regulate fluid flow from the second port to the accumulator;
   a ram in slidable relation to the first portion according to a predefined stroke length, the ram comprising an internal recess;
   a spring disposed in the internal recess;
   a rod moveable by the spring and configured to regulate fluid flow to the accumulator from the first port to the accumulator, the movement of the rod relative to the first port causing the re-routing of the fluid flow through the pressure relief valve.

10. The system of claim 9, wherein the first portion comprises a cylinder head and a rod guide, the cylinder head comprising the first port, the second port, and the pressure relief valve.

11. The system of claim 10, wherein the rod is disposed between the spring and the cylinder head.

12. The system of claim 9, wherein the accumulator comprises a port and the first portion comprises the plural fluid passageways, the plural fluid passageways comprising the first of plural fluid passageways that fluidly couples the first port to the port and the second of the plural fluid passageways that fluidly couples the second port to the first of the plural fluid passageways.

13. The system of claim 12, wherein the pressure relief valve is configured to regulate flow from the second port to the first of the plural fluid passageways through the second of the plural fluid passageways.

14. The system of claim 12, wherein the pressure relief valve is configured to permit fluid flow from the second port to the first of the plural fluid passageways when the rod prevents fluid flow from the first port to the accumulator.

15. The system of claim 12, wherein the pressure relief valve is configured to prevent fluid flow from the second port to the first of the plural fluid passageways when the rod permits fluid flow from the first port to the accumulator.

16. A track tensioning method for controlling track tension for an endless track system for a vehicle, the endless track system comprising a drive wheel, an idler wheel, and an endless track belt, the method comprising:
responsive to application of a braking force of the vehicle, adjusting the track tension using an apparatus comprising an accumulator, a cylinder comprising a moveable rod and a pressure relief valve, and a linkage coupling the apparatus and the idler wheel; and
during retraction of the idler wheel and the cylinder, controlling tension between the endless track belt and the drive wheel by producing an increase in cylinder pressure by re-routing fluid flow to the accumulator from a first of plural fluid passageways to a second of the plural fluid passageways comprising the pressure relief valve after the rod has reached a defined retraction distance.

17. The method of claim 16, further comprising regulating flow from one port of the cylinder to the first of the plural fluid passageways.

18. The method of claim 16, further comprising permitting fluid flow from one port of the cylinder to the first of the plural fluid passageways when fluid flow through another port of the cylinder is prevented by the rod.

19. The method of claim 16, further comprising preventing fluid flow from one port of the cylinder to the first of the plural fluid passageways when the fluid flow through another port of the cylinder is not prevented by the rod.

20. The method of claim 16, wherein the adjustment includes moving a ram of the cylinder through a predefined stroke length.

\* \* \* \* \*